(12) United States Patent
Harkenrider et al.

(10) Patent No.: US 8,326,522 B2
(45) Date of Patent: Dec. 4, 2012

(54) ESTABLISHING WIRELESS NETWORKING BETWEEN A VEHICLE AND DEALERSHIP USING GPS LOCATION INFORMATION

(75) Inventors: Linda Y. Harkenrider, Shelby Township, MI (US); Kier M. Mathieson, Grosse Pointe Farms, MI (US); Craig A. Lambert, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1018 days.

(21) Appl. No.: 12/060,248

(22) Filed: Mar. 31, 2008

(65) Prior Publication Data

US 2009/0248302 A1 Oct. 1, 2009

(51) Int. Cl.
*G01C 21/00* (2006.01)
(52) U.S. Cl. ........................................... 701/300
(58) Field of Classification Search .............. 701/2, 213, 701/300
See application file for complete search history.

(56) References Cited

U.S. PATENT DOCUMENTS

| 2005/0136892 A1* | 6/2005 | Oesterling et al. ............. 455/411 |
| 2006/0212300 A1* | 9/2006 | Resser et al. ....................... 705/1 |
| 2007/0027625 A1* | 2/2007 | Kamdar et al. ................ 701/213 |
| 2007/0126559 A1* | 6/2007 | Adachi ........................ 340/425.5 |
| 2007/0174467 A1* | 7/2007 | Ballou et al. .................. 709/227 |
| 2009/0164053 A1* | 6/2009 | Oesterling ......................... 701/2 |
| 2009/0204407 A1* | 8/2009 | Shields et al. ............. 704/270.1 |

* cited by examiner

*Primary Examiner* — John Nguyen
*Assistant Examiner* — Rodney P King
(74) *Attorney, Agent, or Firm* — Anthony Luke Simon; Reising Ethington P.C.

(57) ABSTRACT

A method and apparatus which enables a vehicle to establish a wireless network connection to a dealership. Upon the vehicle discovering a dealership wireless node, the vehicle obtains dealership GPS coordinates and compares them to the vehicle's own GPS data to determine whether the vehicle is on the dealership's premises. If so, a WiFi connection is established. If not, the wireless node is ignored.

14 Claims, 2 Drawing Sheets

ESTABLISHING WIRELESS NETWORKING BETWEEN A VEHICLE AND DEALERSHIP USING GPS LOCATION INFORMATION

TECHNICAL FIELD

The present invention relates generally to vehicle wireless networking and, more particularly, to techniques for establishing wireless network communication between a vehicle and a dealership wireless node.

BACKGROUND OF THE INVENTION

Dealerships are now often providing wireless access points, also referred to herein as wireless nodes, which enable vehicles at the dealership to wirelessly connect to one or more computers at the dealership. It is desirable to enable the vehicles to automatically connect to the dealership wireless node when the vehicle is on the dealership's premises, yet is also desirable in at least some instances to avoid such connections with the vehicle is merely in the vicinity of the dealership (e.g., passing by the dealership or parked in a nearby location).

SUMMARY OF THE INVENTION

According to an aspect of the invention, there is provided a method and apparatus for establishing a wireless network connection between a dealership and a vehicle. The apparatus can be used to carry out the method which includes the steps of:

wirelessly detecting at a vehicle telematics unit a dealership wireless node located on a dealership's premises;

obtaining location data for the dealership's premises;

determining the vehicle location using a GPS receiver that provides location information to the telematics unit;

determining if the vehicle is on the dealership's premises by comparing the vehicle's location with the dealership location data; and, in response to determining that the vehicle is on the dealership's premises, connecting the telematics unit to the dealership wireless node and transmitting data between the vehicle and dealership.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method and telematics unit operation discussed below enable the establishment of a wireless network connection between a vehicle and dealership in a manner that helps minimize undesired connections that might otherwise occur when the vehicle comes within the dealership's wireless network coverage area. This can occur when, for example, the vehicle comes within the geographic coverage area of the dealership wireless node, but is only passing by the dealership or stopping at an adjacent premises. Before describing the method in detail, a mobile vehicle communication system that includes the telematics unit, dealership, and their wireless networking capabilities will first be described.

Communications System

Figure 1:
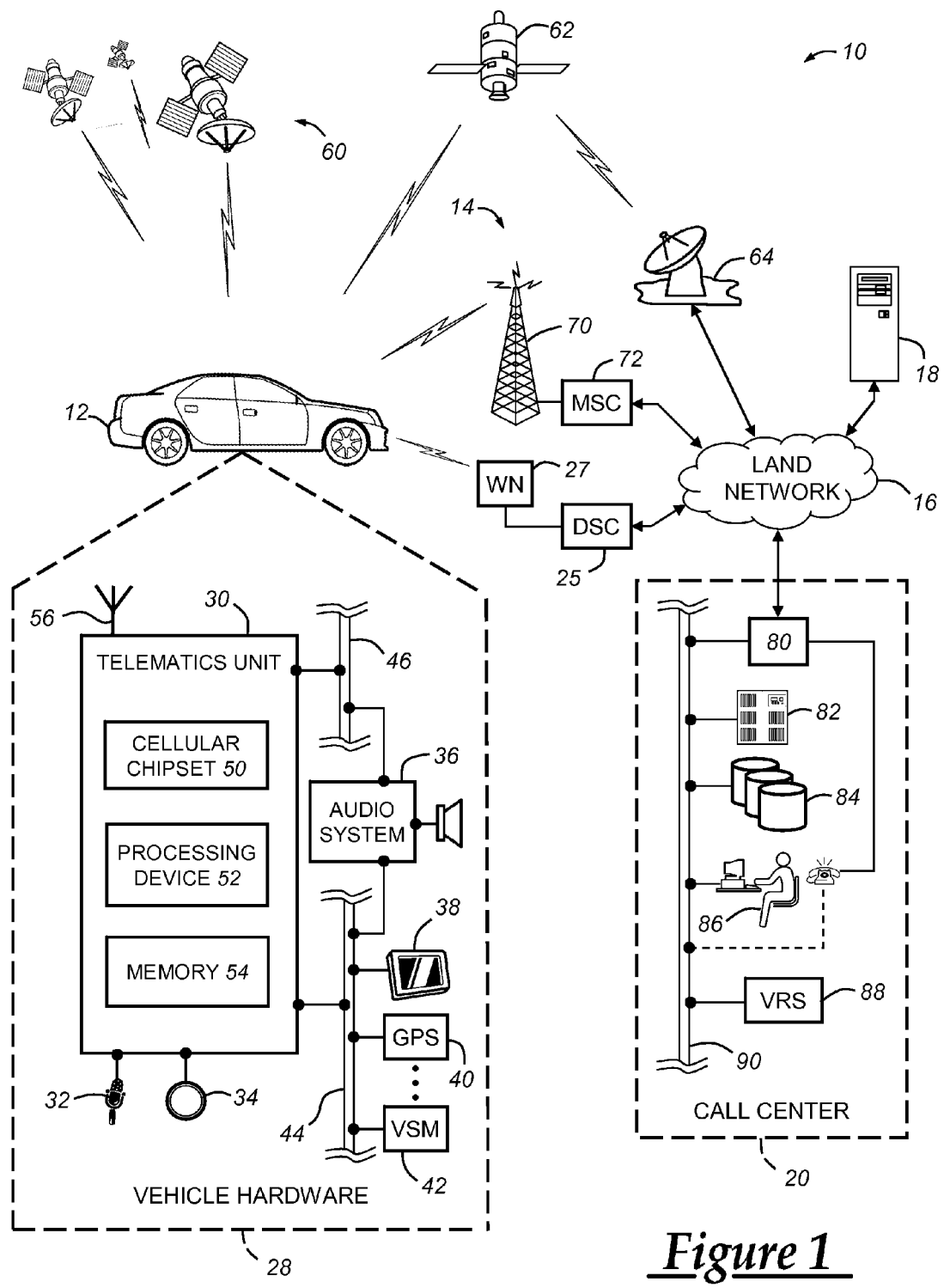
FIG. 1 is a block diagram depicting an exemplary embodiment of a communications system that is capable of utilizing the method disclosed herein.
Figure 2:
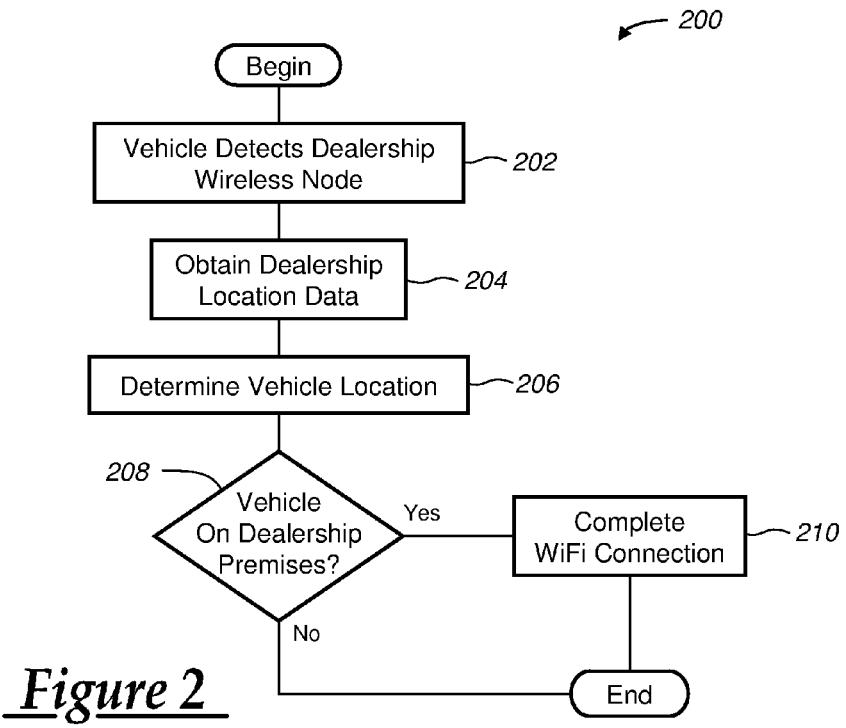
FIG. 2 is a flowchart of a method of establishing a wireless network connection between a vehicle and dealership.

With reference to FIG. 1, there is shown an exemplary operating environment that comprises a mobile vehicle communications system 10 and that can be used to implement the method of FIG. 2. Communications system 10 generally includes a vehicle 12, one or more wireless carrier systems 14, a land communications network 16, a computer 18, call center 20, and dealer service center 25. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 is configured to communicate wirelessly according to one or more wireless protocols, such as WiFi (using an IEEE 802.11 protocol), WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Dealer service center (DSC) 25, also referred to herein as a dealership, is a facility at which vehicle 12 can be taken for various vehicle services. The types of services which the dealership might provide include vehicle maintenance, repair, and aftermarket treatments. These services can involve electronic data exchange with the vehicle, such as to obtain diagnostic information from the vehicle or to provide one or more vehicle components with new programming. For this purpose, the dealership includes a wireless node (WN) 27 at its facility that permits the vehicle to establish a wireless network connection with the dealership 25. This connection can be carried out according to whatever wireless communication technology is used by vehicle 12; for example, the communication can be via WiFi networking using an IEEE 802.11 protocol.

Wireless Connection Method

Figure 3:
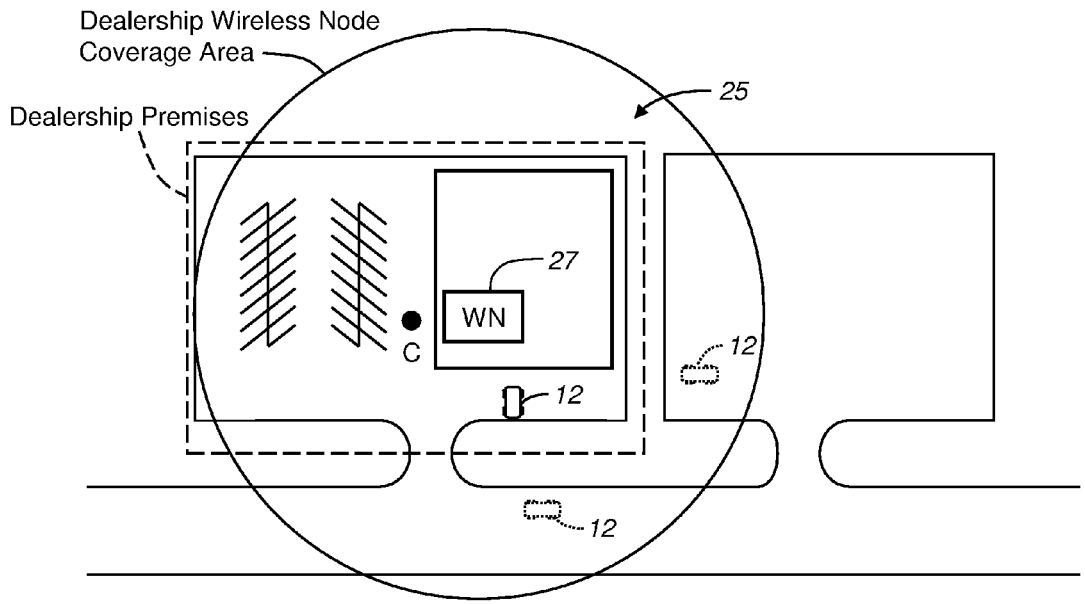
FIG. 3 is a diagram of a dealership premises and wireless node coverage area that is used in explaining the method of FIG. 2.

Turning now to FIGS. 2 and 3, there is shown a method 200 of establishing a wireless network connection between a dealership and a vehicle. The method enables the vehicle to establish the connection only when it is actually on the dealership's premises, regardless of whether it is within the actual coverage area of the wireless node 27. Thus, as indicated in FIG. 3, is some instances the vehicle 12 might be within the coverage area, but not actually on the dealership's premises. This is indicated by the phantom lines showing vehicle 12 at different locations near the dealership, but not on the premises. In other instances, the vehicle will actually be on the premises, either in a parking lot or within the service facility itself, as indicated by the solid line representation of vehicle 12.

The method 200 begins at step 202 where the vehicle telematics unit 30 wirelessly detects the dealership wireless node 27. This can be done using a standard WiFi discovery process that is well known to those in the art. In response to detecting the wireless node 27, the telematics unit 30 obtains location data for the dealership's premises, as indicated at step 204. This location data can take any form suitable for determining the location of the dealership so that it can be compared to the vehicle's location as determined at the vehicle using its GPS module 40. For example, the dealership location data can comprise GPS coordinates. These coordinates can represent the actual position of the wireless node 27 on the premises, or can represent some other fixed location, such as the premises' geographic center C. The dealership location data can also comprise a set of geographic locations representing boundary points of the premises.

Then, at step 206, the telematics unit 30 obtains the vehicle's location from the GPS module 40. The telematics unit then compares the vehicle's location with that of the dealership's premises and determines whether or not the vehicle is actually on the premises, step 208. If so, the process moves to step 210 where the telematics unit 30 and wireless node 27 establish a WiFi connection. As is known to those skilled in the art, this involves switching from the discovery phase into an authentication phase which can be used to establish a secure connection in which the dealership and/or vehicle are authenticated to the other and all communications are encrypted. If at block 208, the vehicle is determined not to be on the dealership's premises, then the process stops and the vehicle does not establish a WiFi connection with the node 27; that is, it does not pass on from the discovery phase into the authentication phase.

The dealership location data can be obtained in a variety of different ways. For example, it can be obtained from the dealership 25 via its wireless node 27, and this can be done in advance of establishing the WiFi connection at step 210 (e.g., before entering the authentication phase). Alternatively, a WiFi connection can be fully established, with the dealership location data then being provided and, if the vehicle is determined to be on the dealership's premises, then the process can move to step 210 to continue the connection and transmit data between the vehicle and dealership, or if not on the premises, then the connection can be terminated. Where the dealership location data is provided to the vehicle telematics unit in advance of establishing the WiFi connection, it can be supplied from the wireless node using a first protocol other than the WiFi protocol used to fully establish a network connection. For example, a protocol such as XMPP can be used to send dealership GPS coordinates to the vehicle before authentication occurs. Other ways of providing such information from the dealership to the vehicle prior to fully establishing the WiFi connection will become apparent to those skilled in the art.

Apart from obtaining the dealership location data from the wireless node 27 at the time the connection is being established, the data can be obtained by the vehicle in other ways. For example, the dealership location data can have been previously stored in memory (e.g., memory 54) at the vehicle. Sources for this pre-established location data can be the manufacturer at the time of building the vehicle, or from the dealership itself when the car was originally purchased, or the information can be supplied during a call between the vehicle and call center 20, and this can be used to periodically update dealership location data for a number of different dealerships located in the locality, state, or country in which the vehicle is located. As another alternative, the dealership location data can be obtained via a call from the vehicle to the call center at the time of establishing the WiFi connection. In these embodiments, the vehicle telematics unit can obtain the dealership location data using information obtained from the wireless node during the discovery process, such as a unique wireless network name that the dealership uses, and this unique network name can be used to lookup the dealership's coordinates from memory or from the call center.

To determine if the vehicle is on the dealership's premises, the perimeter of the premises can be determined and then a comparison made to determine if the vehicle is within that perimeter. In some embodiments, the perimeter can be obtained directly from the dealership location data such as where the GPS coordinates of different boundary points of the premises are provided to the vehicle. Alternatively, the perimeter can be determined by estimating it; for example, by using an assumed radius around the wireless node or center point C and then treating any vehicle located within the circle defined by the radius as being on the premises. Other such means of deciding whether or not the vehicle is on the premises can be used and will be apparent to those skilled in the art.

The step 202 of detecting the dealership wireless node can include not simply detecting a wireless node, but also determining that the wireless node is for a dealership.

In this embodiment, where the discovered node is determined not to be that of a dealer, the telematics unit can treat the node as any hotspot and connect to it to provide the driver or other occupant with various other vehicle services, but where the node is determined to be a dealership node, then the process of FIG. 2 can continue so that the node is either connected to if the vehicle is on the premises, or is ignored altogether.

Apart from the steps depicted in FIG. 2, additional optional steps can be included. For example, the telematics unit and/or dealership wireless node can be configured to provide a welcome screen or other initial dealership connection message on the visual display 38 once the WiFi connection is established. Then, using the illustrated method, the driver or other vehicle occupant will only be presented with the welcome message if (1) the vehicle is determined to be located on the dealership's premises and (2) the connection is fully established.

The method of FIG. 2 can be carried out by suitable programming of the telematics unit 30. This programming can be stored in a computer-readable memory such as memory 54. Depending on the approach taken for obtaining the dealership location data, the wireless node 27 can include suitable programming to support the method 200.

For example, it can include the ability to supply the dealership location data to the telematics unit in advance of actually establishing the WiFi connection using any suitable technique such as one of those identified above.

It is to be understood that the foregoing is a description of one or more preferred exemplary embodiments of the invention. The invention is not limited to the particular embodiment(s) disclosed herein, but rather is defined solely by the claims below.

Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a wireless network connection between a dealership and a vehicle, comprising the steps of:
   wirelessly detecting at a vehicle telematics unit a dealership wireless node located on a dealership's premises;
   obtaining location data for determining the perimeter of the dealership's premises in response to the wireless detection of the dealership wireless node;
   determining the vehicle location using a GPS receiver that provides location information to the telematics unit;
   determining if the vehicle is on the dealership's premises by comparing the vehicle's location with the obtained location data; and, in response to determining that the vehicle is on the dealership's premises,
   connecting the telematics unit to the dealership wireless node and transmitting data between the vehicle and dealership.

2. The method of claim 1, wherein the obtaining step further comprises establishing a data connection between the dealership wireless node and telematics unit and then obtaining the dealership location data from the dealership over the data connection using a first protocol; and
   wherein the connecting step further comprises connecting the telematics unit to the dealership wireless node using a second protocol.

3. The method of claim 2, wherein the second protocol is a WiFi protocol.

4. The method of claim 3, wherein the connecting step further comprises carrying out an authentication process between the dealership wireless node and vehicle telematics unit and then transmitting data between the vehicle and dealership.

5. The method of claim 2, wherein the first protocol is XMPP.

6. The method of claim 1, wherein the obtaining step further comprises obtaining GPS coordinates of the dealership.

7. The method of claim 1, wherein the step of determining if the vehicle is on the dealership's premises further comprises determining a perimeter of the dealership premises from the location data and determining if the vehicle location is within the perimeter.

8. The method of claim 1, wherein the dealership location data is stored in memory on the vehicle and the obtaining step further comprises obtaining the dealership location data from the memory.

9. The method of claim 1, wherein the vehicle includes a visual display within the vehicle for providing messages to an occupant of the vehicle, and wherein the method further comprises the step of providing an initial dealership connection message on the visual display once the vehicle is determined to be on the dealership's premises and once the connection between the telematics unit and wireless node is established.

10. The method of claim 1, wherein the obtaining step further comprises obtaining the dealership location data prior to establishment of a WiFi connection with the dealership wireless node.

11. Vehicle electronics for establishing a wireless network connection between a dealership and a vehicle, comprising:
    a telematics unit; and
    a GPS receiver that supplies vehicle location data to the telematics unit;
    wherein the telematics unit detects an available dealership wireless node in the vicinity of the vehicle, wirelessly receives dealership location data from the dealership wireless node to determine the perimeter of the dealership's premises in response to the wireless detection of the dealership wireless node, compares the dealership location data to the vehicle location data, and establishes a WiFi connection between the vehicle and dealership based on the comparison.

12. Vehicle electronics as defined in claim 11, wherein the telematics unit obtains the dealership location data prior to establishing the WiFi connection.

13. Vehicle electronics as defined in claim 12, wherein the telematics unit obtains the dealership location data from the wireless node using a first protocol and then establishes the WiFi connection using a second protocol.

14. Vehicle electronics as defined in claim 11, wherein the telematics unit detects the available dealership wireless node using a discovery process and wherein the telematics unit obtains the dealership location data using information received from the wireless node during the discovery process.